United States Patent [19]

Nishimura

[11] Patent Number: 5,191,432
[45] Date of Patent: Mar. 2, 1993

[54] METHOD OF RECORDING AND REPRODUCING COLOR VIDEO SIGNAL WITH TYPE CODES TO INDICATE TYPE OF CHROMINANCE SIGNAL

[75] Inventor: Hajime Nishimura, Tokyo, Japan

[73] Assignee: Sony Corporation, Tokyo, Japan

[21] Appl. No.: 802,839

[22] Filed: Dec. 1, 1991

[30] Foreign Application Priority Data

Dec. 13, 1990 [JP] Japan .................... 2-410469

[51] Int. Cl.$^5$ .............................. H04N 9/79
[52] U.S. Cl. ........................... 358/330; 358/310; 358/323; 358/334; 358/12; 358/141; 358/320; 358/337
[58] Field of Search ............... 358/330, 310, 320, 321, 358/323, 337, 334, 328, 335, 12, 14, 15, 141, 146, 147

[56] References Cited

U.S. PATENT DOCUMENTS

| | | | |
|---|---|---|---|
| 4,467,368 | 8/1984 | Horstmann | 358/334 |
| 4,719,519 | 1/1988 | Ide et al. | 358/323 |
| 4,910,605 | 3/1990 | Sasaki et al. | 358/328 |

FOREIGN PATENT DOCUMENTS 2122840 1/1984 United Kingdom ............... 358/320

*Primary Examiner*—Tommy P. Chin
*Assistant Examiner*—Khoi Truong
*Attorney, Agent, or Firm*—Alvin Sinderbrand; William S. Frommer

[57] ABSTRACT

A color video signal recording and reproducing method for recording and reproducing a color line sequential TCI signal which prevents, upon different speed reproduction, a possible displacement in hue of a reproduction color video signal. First and second time base compressed chroma signals for one horizontal period are combined with a time base elongated brightness signal for one horizontal period, and type code signals representative of types of the chroma components are added to form encoded color video signals for two tracks. The encoded color video signals are shuffled and recorded simultaneously onto a magnetic tape by two heads. Reproduction color video signals for two tracks obtained by simultaneous reproduction from the magnetic tape are written into and read out from memories each having a plurality of memory areas in accordance with type code signals separated from the reproduction color video signals for two tracks to obtain deshuffled reproduction color video signals for two tracks, which are subsequently decoded to obtain the original color video signal consisting of the brightness signal and first and second chroma signals.

1 Claim, 14 Drawing Sheets

FIRST FIELD

SECOND FIELD

| | Cw | Cn | Cw | Cn | Cw | | Cw | Cn |
|---|---|---|---|---|---|---|---|---|
| T1 | 40 | 40 | 45 | 46 | 48 | ... | 549 | 550 | 552 | 552 | 557 | - |
| T2 | 42 | 41 | 47 | 47 | 50 | 49 | ... | 551 | 551 | 554 | 553 | - | - |

| | Cn | Cw | Cn | Cw | Cn | | Cn | Cw | Cn |
|---|---|---|---|---|---|---|---|---|---|
| T3 | 41 | 42 | 44 | 44 | 49 | 50 | ... | 548 | 548 | 553 | 554 | 556 | 556 |
| T4 | 43 | 43 | 46 | 45 | 51 | 51 | ... | 550 | 549 | 555 | 555 | - | 557 |

| | Cw | Cn | Cw | Cn | Cw | | Cw | Cn | Cw | Cn |
|---|---|---|---|---|---|---|---|---|---|---|
| T5 | 603 | 603 | 608 | 609 | 611 | 611 | ... | 1112 | 1113 | 1115 | 1115 | 1120 | - |
| T6 | 605 | 604 | 610 | 610 | 613 | 612 | ... | 1114 | 1114 | 1117 | 1116 | - | - |

| | Cn | Cw | Cn | Cw | Cn | | Cn | Cw | Cn | Cw |
|---|---|---|---|---|---|---|---|---|---|---|
| T7 | 604 | 605 | 607 | 607 | 612 | 613 | ... | 1111 | 1111 | 1116 | 1117 | 1119 | 1119 |
| T8 | 606 | 606 | 609 | 608 | 614 | 614 | ... | 1113 | 1112 | 1118 | 1118 | - | 1120 |

FIG. 10A (S1)

| | B | R | B | R | | | R | B | R |
|---|---|---|---|---|---|---|---|---|---|
| T1 | 40 | 40 | 44 | 48 | | 545 | 548 | 552 | 553 | 556 |
| T2 | 42 | 41 | 45 | 48 | | 547 | 549 | 554 | 555 | 557 |

FIG. 10B (S2)

| | B | R | B | R | | | R | B | R |
|---|---|---|---|---|---|---|---|---|---|
| T3 | 44 | 42 | 46 | 52 | 50 | 549 | 550 | 556 | 554 | 557 |
| T4 | 46 | 43 | 47 | 54 | 51 | 551 | — | 555 | — | — |

FIG. 10C (S3)

| | B | R | B | R | | | R | B | R |
|---|---|---|---|---|---|---|---|---|---|
| T5 | 603 | 603 | 604 | 607 | 611 | 1108 | 1111 | 1115 | 1116 | 1119 |
| T6 | 605 | 604 | 606 | 608 | 613 | 612 | 1110 | 1112 | 1117 | 1118 | 1120 |

FIG. 10D (S4)

| | B | R | B | R | | | R | B | R |
|---|---|---|---|---|---|---|---|---|---|
| T7 | 607 | 605 | 608 | 609 | 615 | 613 | 1112 | 1113 | 1119 | 1117 | 1120 |
| T8 | 609 | 606 | 610 | 610 | 617 | 614 | 1114 | 1114 | — | 1118 | — |

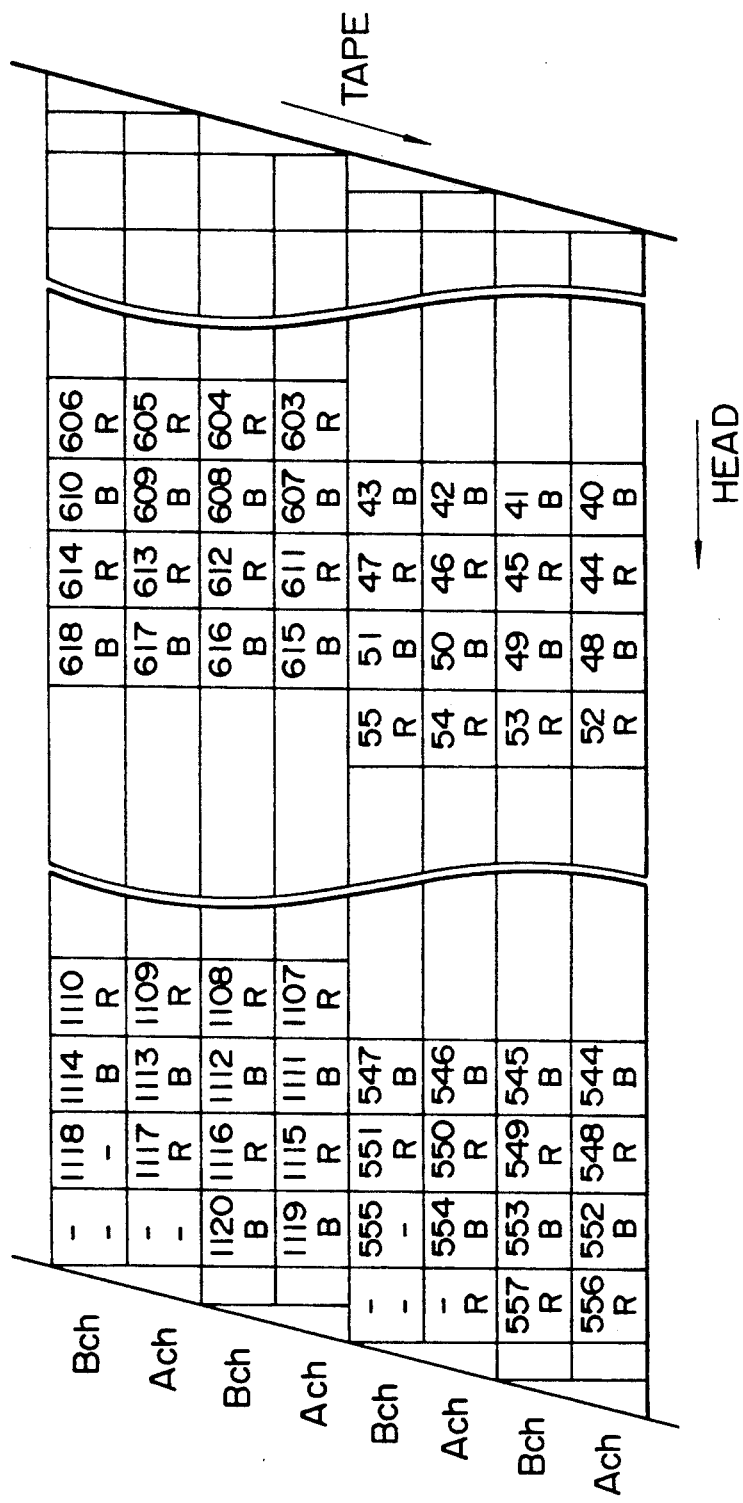

FIG. 12A S1

| | B | R | B | R | | R | B | R |
|---|---|---|---|---|---|---|---|---|
| T1 | 40 | 40 | 44 | 48 | | 545 | 548 552 | 552 553 556 |
| T2 | 42 | 41 43 | 45 | 48 49 | | 557 | 549 554 | 553 555 557 |

FIG. 12B S2

| | B | R | B | R | | R | B | R |
|---|---|---|---|---|---|---|---|---|
| T3 | 44 | 42 45 | 46 | 52 50 | | 549 | 550 556 | 554 557 – |
| T4 | 46 | 43 47 | 47 | 54 51 | | 551 | 551 – | 555 – – |

FIG. 12C S3

| | R | B | R | B | | B | R | B |
|---|---|---|---|---|---|---|---|---|
| T5 | 603 | 603 607 | 604 | 611 611 | | 1108 | 1111 1115 | 1115 1116 1119 |
| T6 | 605 | 604 606 | 608 | 613 612 | | 1110 | 1112 1117 | 1116 1118 1120 |

FIG. 12D S4

| | R | B | R | B | | B | R | B |
|---|---|---|---|---|---|---|---|---|
| T7 | 607 | 605 608 | 609 | 615 613 | | 1112 | 1113 1119 | 1117 1120 – |
| T8 | 609 | 606 610 | 610 | 617 614 | | 1114 | 1114 – | 1118 – – |

TWO TIMES SPEED

*HATCHED PORTION REPRESENTS NOISE BAR SECTION

THREE TIMES SPEED

METHOD OF RECORDING AND REPRODUCING COLOR VIDEO SIGNAL WITH TYPE CODES TO INDICATE TYPE OF CHROMINANCE SIGNAL

BACKGROUND OF THE INVENTION

1. Field of the Invention

This invention relates to a method of recording and reproducing a color video signal.

2. Description of the Prior Art

A method of recording a color video signal is disclosed in Japanese Patent Laid-Open Application No. 63-194494 wherein first and second color signals of a color video signal, which is composed of a brightness signal and such first and second color signals, are converted into a line sequential signal and then time base compressed, whereafter they are multiplexed with the brightness signal (into a horizontal blanking period of such brightness signal), and then the thus multiplexed signal (color line sequential TCI (time compressed integration) signal or color line sequential TDM (time division multiplexed) signal) is time base elongated to almost twice and then divided into signals of two channels, whereafter such signals of two channels for one field are recorded simultaneously onto two tracks by two (or three) scanning operations.

Such color line sequential TCI signal as described above is a high definition television signal wherein one frame includes a total of 1,125 scanning lines and effective lines of a first field range from the 40th to 557th lines while effective lines of a second field range from the 603rd to 1,120th lines. First and second time base compressed color signals to be multiplexed with a brightness signal Y are a wide band color signal Cw and a narrow band color signal Cn, respectively.

A video tape recorder records and reproduces such color line sequential TCI signal as mentioned above. Referring to FIGS. 8A to 8D, signals of two channels obtained by time base elongating and shuffling a color line sequential TCI signal for one frame are shown. Such signals are supplied by way of an emphasis circuit and an FM modulating circuit to an recorded by a rotary magnetic head apparatus.

Such rotary magnetic head apparatus includes four rotary magnetic heads mounted on a rotary drum of a tape guiding drum apparatus, and two sets of such rotary magnetic heads each including a pair of the rotary magnetic heads disposed adjacent each other are disposed in an angularly spaced relationship by an angle of 180 degrees from each other. The magnetic gaps of the adjacent rotary magnetic heads in each set have different azimuth angles from each other, and the azimuth angles of the magnetic gaps of the four rotary magnetic heads are set such that, when the four rotary magnetic heads rotate one full rotation, four inclined tracks may be formed at sucessively different recording azimuth angles on a magnetic tape.

Thus, when the four rotary magnetic heads rotate two full rotations, four sets of segment inclined tracks are formed simultaneously for each two tracks on a magnetic tape in accordance with recording signals 1 supplied to the four rotary magnetic heads. FIGS. 8A to 8D illustrate construction of such recording signals S1 (T1, T2), S2 (T3, T4) S3 (T5, T6) and S4 (T7, T8) for each ½ field. In FIGS. 8A to 8D, each numeral denotes a line number of a brightness signal Y (reference character Y is omitted) or a color signal Cw or Cn.

In this instance, the line signals for the brightness signal Y are distributed in the order of the recording signals T1, T2, T3, T4, T3, T4, T1, T2, T1, T2, T3, T4, T3, T4, T1, T2, ... of the segment inclined tracks and in the order of the recording signals T5, T6, T5, T8, T7, T8, T5, T6, T5, T6, T7, T8, T7, T8, T5, T6, ... Meanwhile, the color signals Cw and Cn are disposed alternately for each line for the recording signals T1 to T8 of the segment inclined tracks, and besides, colors signals of the first lines of the recording signals S1 to S4 of the segment inclined tracks in each pair are disposed alternately like Cw, Cn, Cw, Cn, ...

When such recording signals as shown in FIGS. 8A to 8D are supplied to the rotary magnetic head apparatus described above and recorded onto a magnetic tape, such a recording pattern 1' as shown in FIG. 7 is formed on the magnetic tape. Referring to FIG. 7, reference characters Ach and Bch denote two segment inclined tracks onto which signals are recorded simultaneously; and each numeral denotes a line number of a brightness signal while line numbers for color signals Cw and Cn are omitted. It is to be noted that characters W and N in FIG. 7 correspond to Cw and Cn in FIGS. 8A to 8D, respectively. The recording signals T1, T3, T5 and T7 for a ½ field of the recording signals in FIGS. 8A to 8D are recorded on the sequential tracks Ach extending from the bottom to the top in FIG. 7 while the recording signals T2, T4, T6 and T8 are recorded on the sequential tracks Bch extending similarly from the bottom to the top. It is to be noted that the positions of the recording signals S1 to S4 of the segment inclined tracks in each pair on the magnetic tape are displaced sequentially by a distance corresponding to 0.5 H (H is a length on the magnetic tape corresponding to a horizontal period).

Such conventional color video signal recording method is advantageous in that joint portions when recording signals for one field are recorded onto a magnetic tape by two scanning operations can be hidden above and below a reproduction screen; that, is due to shuffling, even if one of recording signals of two channels recorded simultaneously with each other drops out, upon reproduction, due to clogging of a rotary magnetic head, a color picture image of an ordinary hue can be reproduced; that is, since a particular relationship is established between color signals of adjacent tracks, reduction of crosstalk can be achieved; and so forth.

Meanwhile, there is no trouble when color video signals recorded on a magnetic tape in accordance with such conventional color video signal recording method as described are reproduced by means of rotary magnetic heads while the magnetic tape is fed at a same speed as that upon recording. However, when the magnetic tape is reproduced while it is fed at a speed different from that upon recording, that is, in the case of different speed reproduction, there is the possibility that a color signal of a reproduction line signal of a line signal recorded at a starting end of each segment inclined track or of another reproduction line signal reproduced first after track jumping and another color signal of a different reproduction line signal immediately prior to such reproduction line signal may be reproduced in a wrong order, which will cause a displacement in hue of a reproduction color video signal.

SUMMARY OF THE INVENTION

It is an object of the present invention to provide a color video signal recording and reproducing method for recording and reproducing a color line sequential TCI signal (or TDM signal) which prevents, upon different speed reproduction, possible reproduction in a wrong order of a color signal of a reproduction line signal of a line signal recorded at a starting point of each segment inclined track or of another reproduction line signal reproduced first after track jumping and a color signal of a different reproduction line signal immediately prior to such reproduction line signal, which will cause a displacement in hue of a reproduction color video signal.

In order to attain the object, according to the present invention, there is provided a method of recording and reproducing a color video signal, comprising the steps of time base elongating a brightness signal in an original color video signal, which includes such brightness signal and first and second chroma signals of different chroma components from each other, to obtain a time base elongated brightness signal and time base compressing the first and second chroma signals to obtain first and second time base compressed chroma signals, combining the first and second time base compressed chroma signals for one horizontal period alternatively with the time base elongated brightness signal for one horizontal period, adding type code signals representative of types of the thus combined chroma components to form a time division multiplexed color video signal for N tracks, N being an integer equal to or higher than 2, shuffling the time division multiplexed color video signal for the N tracks for each predetermined video signal unit to obtain recording color video signals, and recording the thus obtained recording color video signals simultaneously onto a record medium by means of N heads, reproducing such recording color video signals for the N tracks recorded on the record medium simultaneously by N heads to obtain reproduction color video signals for the N tracks, separating the type code signals from the reproduction color video signals for the N tracks, and writing and then reading the reproduction color video signals for the N tracks into and from deshuffling memories each having a plurality of memory areas in accordance with the thus separated type code signals to obtain deshuffled reproduction color video signals for the N tracks, and decoding the deshuffled reproduction color video signals for the N tracks to obtain the original color video signal consisting of the brightness signal and first and second chroma signals.

With the color video signal recording and reproducing method, reproduction color video signals for the N tracks obtained by simultaneous reproduction by the N heads of recording color video signals for the N tracks recorded on a record medium are written into and read out from the deshuffling memories each having the plurality of memory areas in accordance with type code signals separated from the production color video signals for the N tracks to obtain deshuffled reproduction color video signals for the N tracks, and the thus obtained deshuffled reproduction video signals for the N tracks are decoded to obtain an original color video signal consisting of a brightness signal and first and second chroma signals. Accordingly, upon different speed reproduction, the order of a color signal of a reproduction line signal of a line signal recorded at a starting point of each segment inclined track or another reproduction line signal reproduced first after track jumping and another color signal of a reproduction line signal immediately prior to the reproduction line signal is maintained regularly, and consequently, there is no possibility that the hue of a reproduction color video signal may be displaced due to an otherwise possible wrong order of such color signals.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 8A, 8B, 8C and 8D are diagrams showing recording signals for use with the recording pattern shown in FIG. 7;

FIGS. 10A, 10B, 10C and 10D are diagrams showing recording signals for use with the recording pattern shown in FIG. 9;

FIG. 11 is a diagram showing a further recording pattern to which a color video signal recording method according to the present invention can be applied;

FIGS. 12A, 12B, 12C and 12D are diagrams showing recording signals for use with the recording pattern shown in FIG. 11;

DETAILED DESCRIPTION OF THE PREFERRED EMBODIMENT

Figure 1:
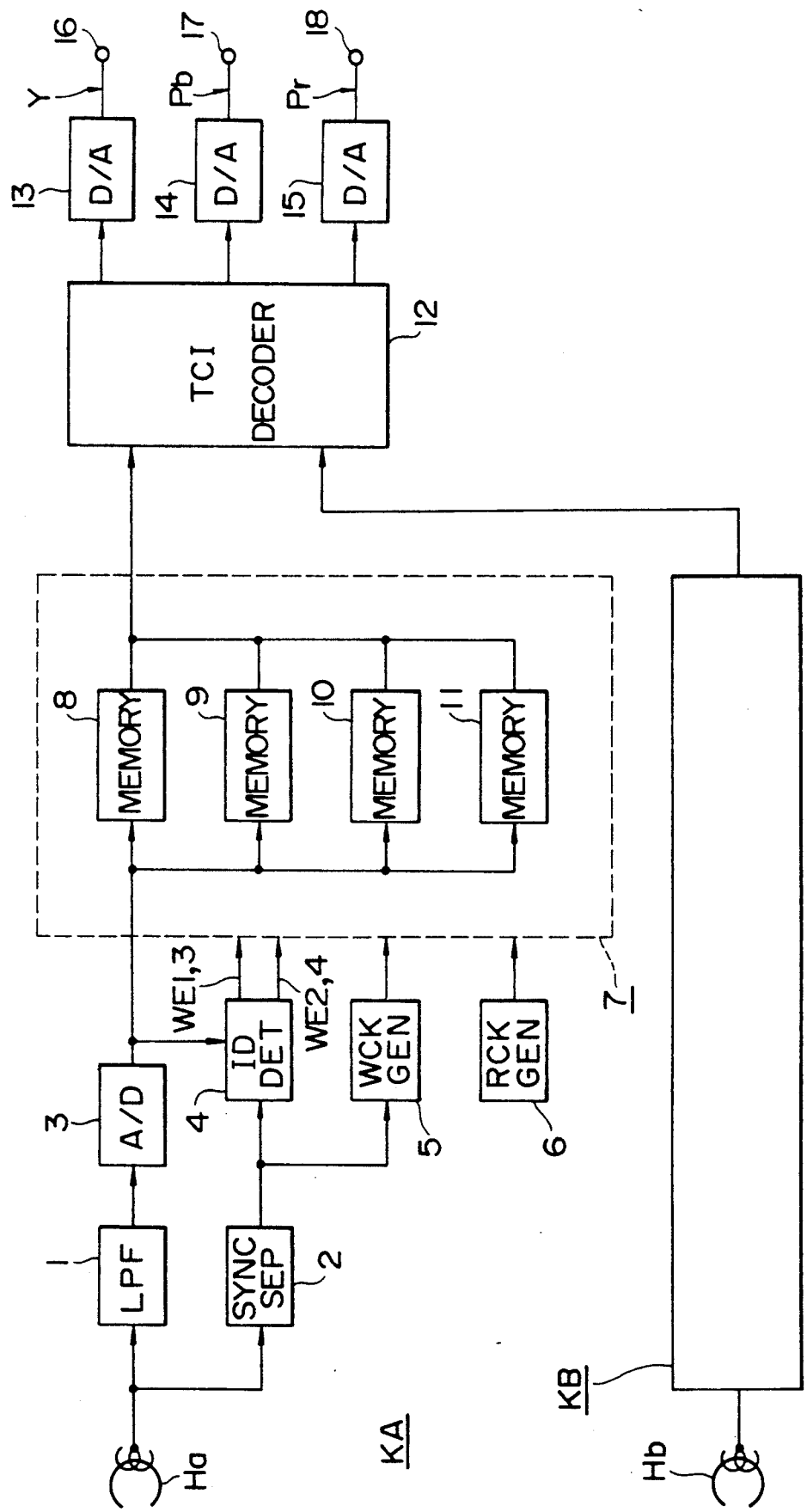
FIG. 1 is a block diagram of a reproducing system of a color video signal recording and reproducing apparatus to which a color video signal recording and reproducing method according to the present invention is applied.

A color video signal recording method to which the present invention can be applied can be applied not only to the recording signals 1 and recording pattern 1' shown in FIGS. 8A to 8D and FIG. 7, respectively, and described hereinabove but also to such recording signals 2 and recording pattern 2' as shown in FIGS. 10A to 10D and FIG. 9, respectively, and such recording signals 3 and recording pattern 3' as shown in and FIGS. 12A to 12D and FIG. 11, respectively. Thus, description will be first given of such recording signals and recording patterns.

FIGS. 10A to 10D show recording signals 2 for a ½ field to be supplied to four rotary magnetic heads when four sets of segment inclined tracks are formed successively simultaneously for two tracks on a magnetic tape when the four rotary magnetic heads rotate two full rotations, that is, recording signals S1 (T1, T2), S2 (T3, T4), S3 (T5, T6) and S4 (T7, T8). In FIGS. 10A to 10D, each numeral denotes a line number of a brightness signal Y (reference character Y is omitted) or a color signal Pr or Pb.

In this instance, the line signals of the brightness signal Y are distributed in the order of recording signals of the segment inclined tracks T1, T2, T3, T4, T1, T2, T3, T4, . . . and in the order of recording signals of the segment inclined tracks T5, T6, T7, T8, T5, T6, T7, T8, . . .

In horizontal periods upon first video signal recording of the recording signals T1, T2, T3 and T4 of the first to fourth segment inclined tracks, a chroma signal Pb of the N-th (N=40, here, but not limited to this) line is recorded with the recording signal T1; a chroma signal Pb of the N+2-th line is recorded with the recording signal T2; a chroma signal Pb of the N+4-th line is recorded with the recording signal T3; and a chroma signal Pb of the N+6-th line is recorded with the recording signal T4. Then, in horizontal periods upon next video signal recording, a chroma signal Pr of the N+1-th line is recorded with the recording signal T1; a chroma signal Pr of the N+3-th line is recorded with the recording signal T2; a chroma signal Pr of the N+5-th line is recorded with the recording signal T3; and a chroma signal Pr of the N+7-th line is recorded with the recording signal T4.

Figure 9:
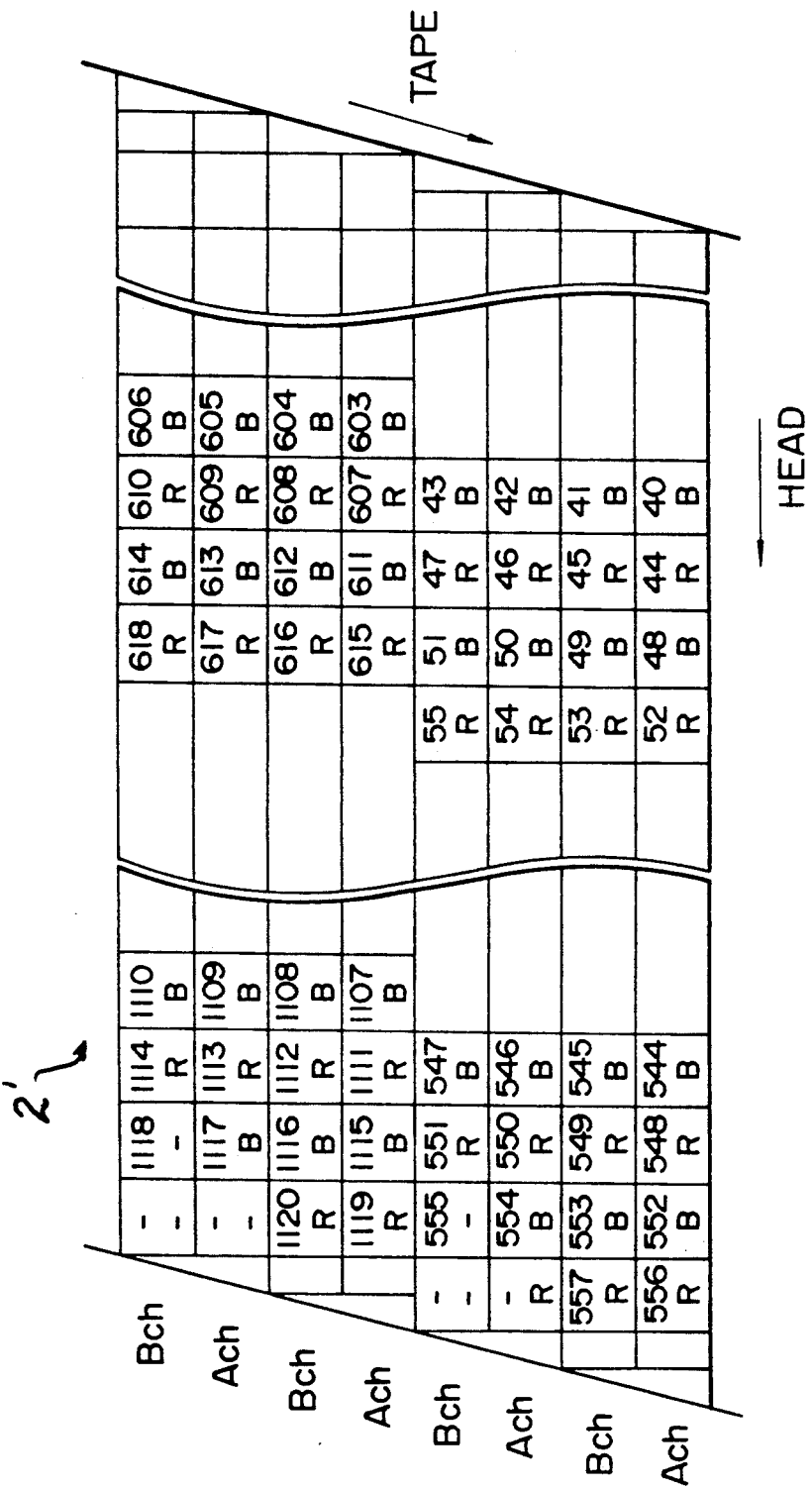
FIG. 9 is a diagram showing another recording pattern to which a color video signal recording method according to the present invention can be applied.

FIG. 9 shows a recording pattern 2' when the recording signals 2 shown in FIGS. 10A to 10D are supplied to the rotary magnetic head apparatus described above and recorded onto a magnetic tape. In FIG. 9, reference characters Ach and Bch indicated adjacent each other denote two segment inclined tracks onto which signals are recorded simultaneously, and each numeral denotes a line number of a brightness signal while a line number of a color signal is omitted. It is to be noted that the recording signals T1, T3, T5 and T7 for a ½ field of the recording signals in FIGS. 10A to 10D are recorded on the sequential tracks Ach extending from the bottom to the top in FIG. 9 while the recording signals T2, T4, T6 and T8 are recorded on the sequential tracks extending similarly from the bottom to the top. It is further to be noted that the positions of the recording signals S1 to S4 of the segment inclined tracks in each pair on the magnetic tape are displaced sequentially by a distance corresponding to 0.5 H (H is a length on the magnetic tape corresponding to a horizontal period).

As can be readily seen from the recording signals 2 of FIGS. 10A to 10D, according to the color video signal recording method, successively adjacent color signals Pr and Pb of the recording signals T1 to T4 of the four segment inclined tracks are identical to each other. Similarly, successively adjacent color signal Pr and Pb of the recording signals T5 to T8 of the other four segment inclined tracks are identical to each other. Consequently, color signals can be matched readily upon different speed reproduction, and even if an offset takes place between fields upon different speed reproduction, such offset can be corrected readily. Besides, crosstalk in a field can be reduced sufficiently.

It is to be noted that, while the recording signals T2 and T3 in FIGS. 10A to 10D and 9 can be exchanged for each other or the recording signals T6 and T7 can be exchanged for each other, illustration of such alternative recording patterns is omitted.

FIGS. 12A to 12D and FIG. 11 show modified recording signals 3 and a modified recording pattern 3' to the recording signals 2 of FIGS. 10A to 10D and the recording pattern 2 of FIG. 9, repectively. However, description of detailed construction of such recording signals 3 and recording pattern 3 is omitted herein to avoid redundancy. As can be seen readily from the recording signals shown in FIGS. 12A to 12D, according to the color video signal recording system, successively adjacent color signals Pr and Pb of recording signals T1 to T4 of four segment inclined tracks are identical to each other, and similarly, successively adjacent color signals Pr and Pb of recording signals T5 to T8 of the other four segment inclined tracks are identical to each other. Consequently, color signals can be matched readily upon different speed reproduction, and even if an offset takes place between fields upon different speed reproduction, such offset can be corrected readily. Besides, crosstalk in a field can be reduced sufficiently.

Figure 13A:
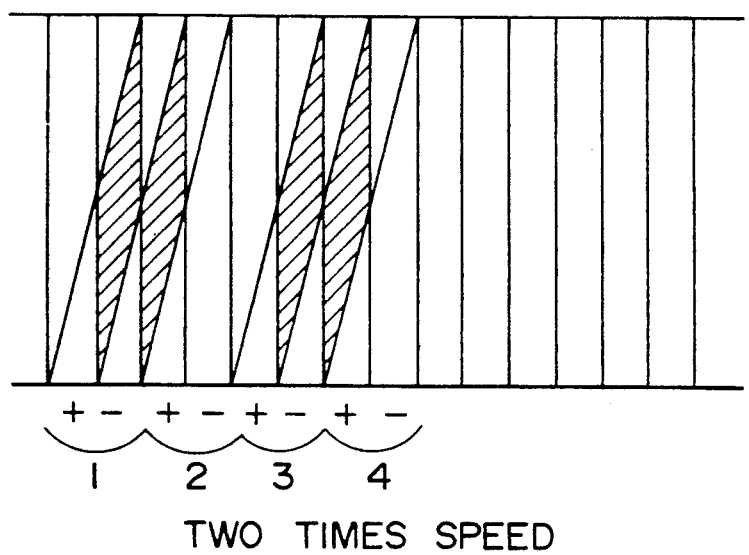
FIGS. 13A and 13B are diagrams showing scanning loci of heads when a magnetic tape is fed at a speed twice or three times that upon standard speed reproduction.
Figure 13B:
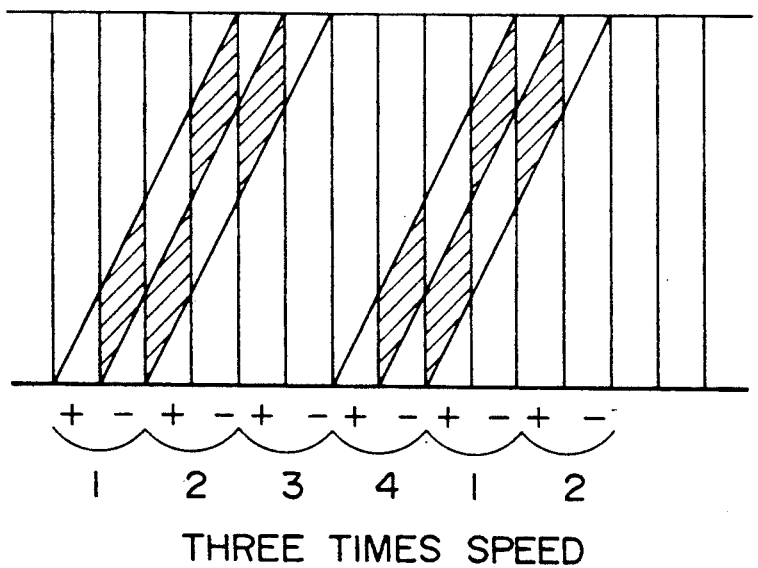

FIGS. 13A and 13B illustrate manners of portions (indicated by hatching lines) in which reproduction signals make noise, when different speed reproduction, for example, two times speed reproduction and three times speed reproduction are performed, respectively, with the rotary magnetic head apparatus described above, due to segment inclined tracks on a magnetic tape not coinciding with scanning loci of the rotary magnetic head and also due to azimuth angles of the magnetic gaps of the rotary magnetic heads not coinciding with recording azimuth angles of the segment inclined tracks. It is to be noted that the marks "+" and "−" in FIGS. 13A and 13B denote differences of recording azimuth angles of segment inclined tracks. It can be seen from FIGS. 13A and 13B that, where a magnetic tape is fed at a speed an integral number of times that upon ordinary speed feeding, whether the integral number is an even number or an odd number, the positions of noise bars are overlapped on a reproduction screen with each other for each ½ field.

Figure 14:
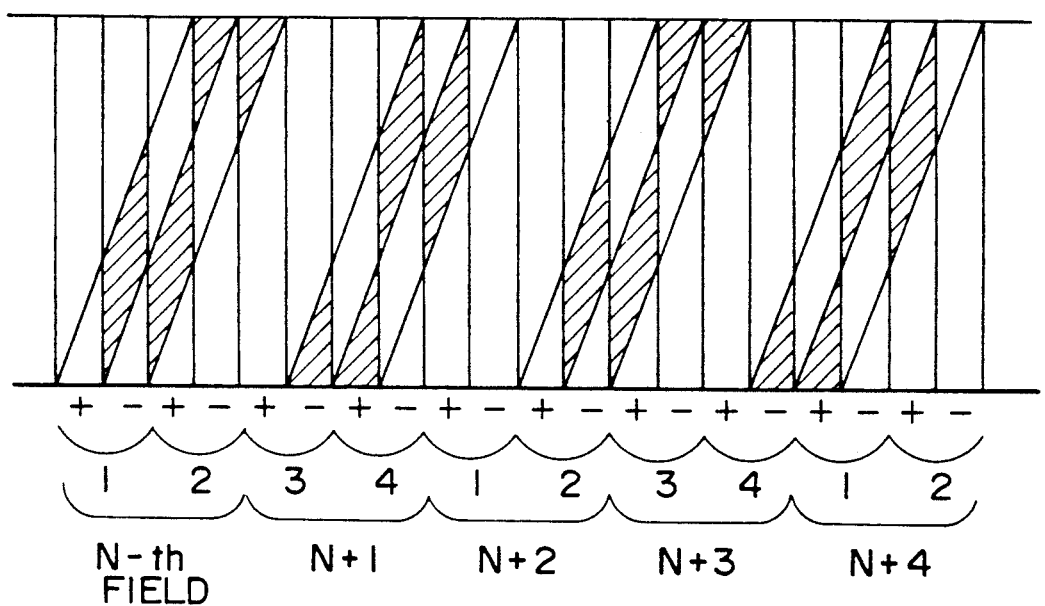
FIG. 14 is a diagram showing scanning loci of heads when a magnetic head is fed at a speed 2.5 times that upon standard speed reproduction.

Meanwhile, FIG. 14 illustrates a manner of portions (indicated by hatching lines) in which reproduction signals make noises, when 2.5 times speed reproduction is performed with the rotary magnetic head apparatus described above, due to segment inclined tracks on a magnetic tape not coinciding with scanning loci of the rotary magnetic heads and also due to azimuth angles of the magnetic gaps of the rotary magnetic heads not coinciding with recording azimuth angles of the segment inclined tracks. It can be seen from FIG. 14 that, where a magnetic tape is fed at a speed R+0.5 (R is either 0 or a positive or negative integral number) times that upon ordinary speed feeding, the positions of noise bars are different and not overlapped on a reproduction screen from and with each other for each ½ field.

Figure 2:
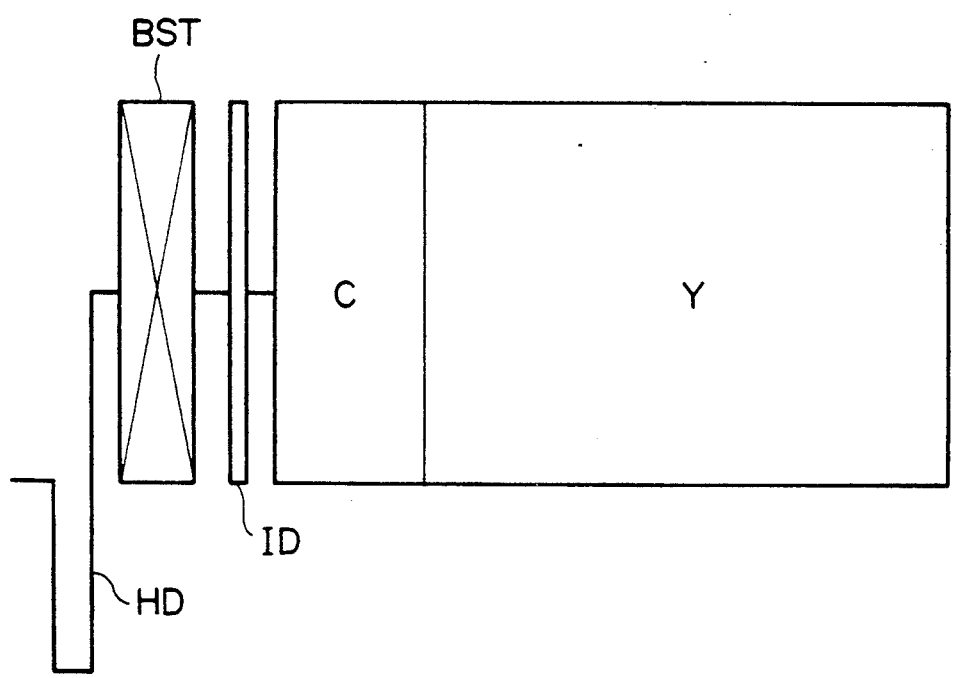
FIG. 2 is a waveform diagram showing a waveform of a recording TCI signal which is used in a color video signal recording and reproducing method of the present invention.

A video tape recorder to which a color video signal recording and reproducing method of the present invention is applied will be described subsequently. First, a recording system will be described briefly. In the recording system, a brightness signal Y and first and second color signals (blue and red color difference signals) Pb and Pr are converted from analog signals into digital signals, and then the digital bright signal Y and digital color signals Pb and Pr are encoded by a TCI encoder. In particular, the first and second digital color signals Pb and Pr are converted into a line sequential signal and time base compressed to one fourth (¼). The first and second color signals Pb and Pr are combined for one horizontal periods thereof alternately with the digital brightness signal Y for one horizontal period to form a signal for one horizontal period to obtain a time division multiplexed signal (TCI signal). In this instance, a type code signal ID representing to which one of the first and second digital color signals a digital color signal C in a signal for each one horizontal period of the time base multiplexed signal belongs is inserted, for example, into a horizontal blanking period as shown in FIG. 2. Such type code signal ID is a 1-bit signal and assumes a value "1" when the signal belongs to the first color signal Pb but assumes another value "0" when the signal belongs to the second color signal Pr (or the reverse values may be assigned to them). It is to be noted that reference character HD denotes a horizontal synchronizing signal, and BST denotes a burst signal.

The multiplexed signal (TCI signal) is then time base elongated about two times and divided into two channels A and B, and the multiplexed signals of the two channels are stored into frame memories for the channels A and B to effect writing and reading thereof into and out of the frame memories to effect shuffling of them. Each of the frame memories for the channels A and B is constituted from four memories connected in parallel to each other.

Where the four memories constituting each of the frame memories for the channels A and B are represented by M1 to M4, when time base elongated digital TCI signals for two fields are supplied to each of the frame memories, signals in the first field are written into the memories M1 and M2 alternately for each horizontal period, but signals in the second field are written into the memories M3 and M4 alternately for each horizontal period. Then, the time base elongated digital TCI signals shuffled for each one field corresponding to the four sets of inclined tracks are read out successively for a ½ field from the memories M1, M2, M3 and M4.

The shuffled, time base elongated TCI signals of the two channels from the frame memories for the channels are supplied individually to digital to analog converters, at which they are converted into analog signals. The analog TCI signals of the two channels are then supplied by way of low-pass filters to FM modulators, at which they are FM modulated.

The magnetic gaps of the two sets of rotary magnetic heads disposed adjacent each other on a rotary drum of a tape guiding apparatus have different azimuth angles from each other, and the magnetic gap azimuth angles of the four rotary magnetic heads are set such that, when the four rotary magnetic heads rotate one full rotation, four inclined tracks having recording azimuth angles different successively as $+\theta, -\theta, +\theta, -\theta$ may be formed on a magnetic tape.

The FM modulated signals of the two channels are successively supplied to the two sets of, that is, four, rotary magnetic heads so that the time base elongated TCI signals for one field are recorded in such a manner that two sets of inclined tracks for two channels may be formed on a magnetic tape by one full rotation of the rotary magnetic heads and accordingly four sets of inclined tracks for two channels may be formed on the magnetic tape by two full rotations of the rotary magnetic heads.

Referring now to FIG. 1, there is shown a reproducing system of a video tape recorder to which a color video signal recording and reproducing method of the present invention is applied and which is constructed taking different speed reproduction into consideration. A magnetic tape onto which signals have been recorded by means of the recording system in such a manner described above is reproduced by the reproducing system such that signals of two channels thereon are reproduced simultaneously by means of two different sets of rotary magnetic heads Ha, Hb and Ha, Hb having the same arrangement and same magnetic gap azimuth angles as those upon recording.

Reproduction signals from the two channels, that is, from the four rotary magnetic heads Ha, Hb and Ha, Hb are supplied to and FM demodulated by FM demodulators not shown in circuits KA and KB for the channels A and B having a same circuit construction so that shuffled, time base elongated TCI signals are obtained. In each of the circuits KA and KB, the shuffled, time base elongated TCI signal is supplied by way of a low-pass filter 1 to an analog to digital (A/D) converter 3, at which it is converted into a digital signal. The shuffled, time base elongated digital TCI signal is then supplied to a frame memory 7, from which it is read out in a condition wherein it undergoes deshuffling, time base error correction and so forth. The frame memory 7 is constructed from four memories 8 to 11 connected in parallel to each other.

Meanwhile, the shuffled, time base elongated TCI signal from the FM demodulator in each of the circuits KA and KB is supplied also to a synchronizing separator circuit 2, by which a horizontal synchronizing signal, a burst signal and so fourth are separated therefrom. Such horizontal synchronizing signal, burst signal and so forth are supplied to a detectng circuit 4 for detecting a type code signal ID and a write clock signal generator 5. Then, detection outputs of the detecting circuit 4, that is, write enable signals WE1, WE3 and WE2, WE4, and a write clock signal from the clock signal generator 5 are supplied to the frame memory 7. A read clock signal generator 6 generates a reference clock signal or a signal obtained by phase modulation of such reference clock signal with a signal obtained by integration of a velocity error signal and supplies it to the frame memory 7. It is to be noted that such velocity error signal is produced from a horizontal synchronizing signal and a burst signal from the synchronizing separator circuit 2 and stored into and then read out from a memory not shown so as to be timed with a time base corrected, deshuffled, time base elongated TCI signal read out from the frame memory 7. Meanwhile, the shuffled, time base elongated TCI signal from the analog to digital converter 3 is supplied also to the type code signal ID detecting circuit 4.

Figure 3:
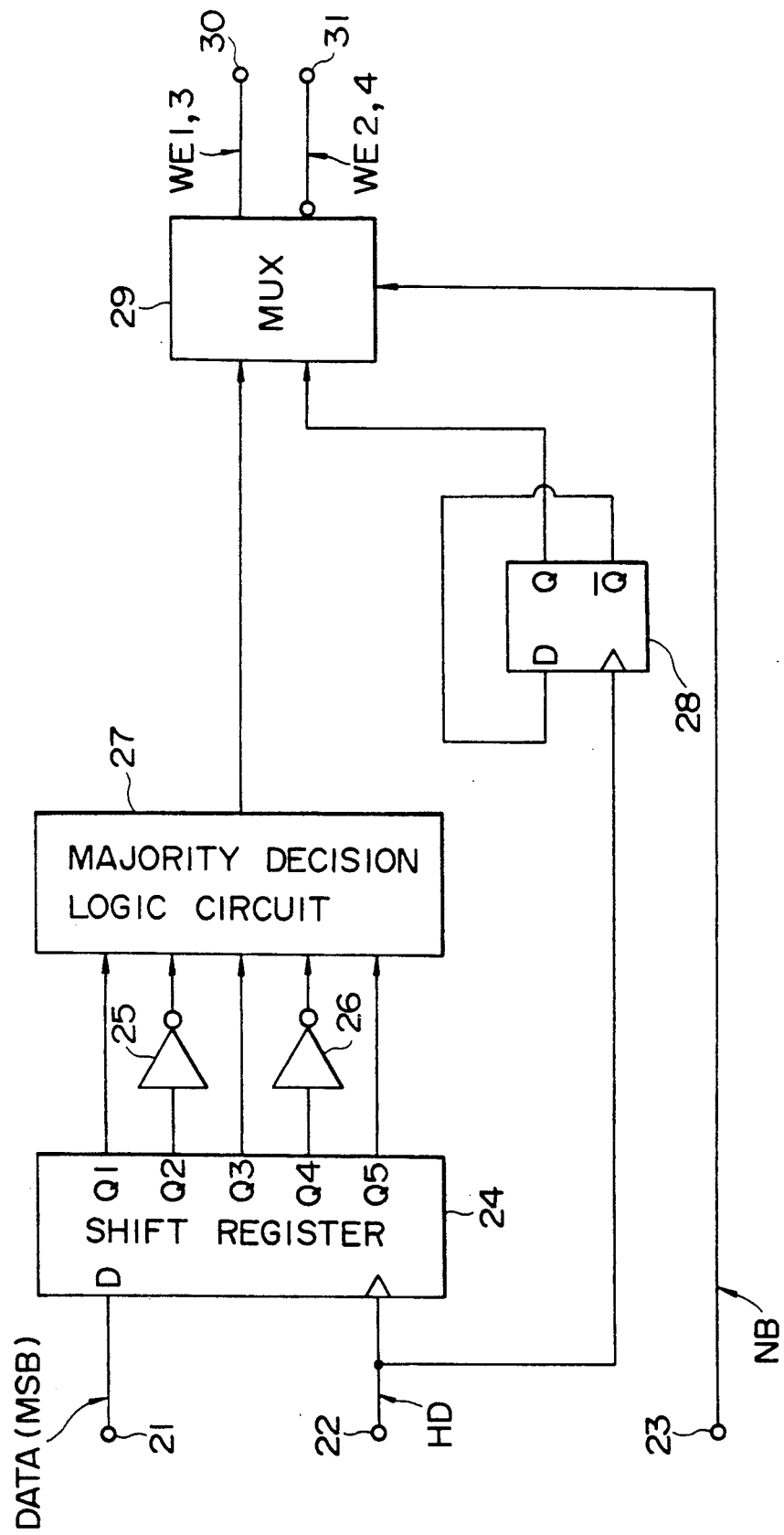
FIG. 3 is a block diagram of a type code signal detecting circuit of the reproducing system shown in FIG. 1.

Referring now to FIG. 3, details of such type code signal ID detecting circuit 4 are shown. The code signal ID detecting circuit 4 shown includes a shift register 24 to which an MSB (most significant bit) of a shuffled, time base elongated TCI signal is supplied as a data signal from an input terminal 21 and a horizontal synchronizing signal HD is supplied as a clock signal from another input terminal 22. Parallel 5-bit output signals Q1, Q2, Q3, Q4 and Q5 are outputted from the shift register 24. The output signals Q1, Q3 and Q5 are supplied directly to a majority decision logic circuit 27 while the outut signals Q2 and Q4 are supplied to the majority decision logic circuit 27 by way of a pair of invertors 25 and 26, respectively. At the majority decision logic circuit 27, type code signals ID for 5 lines sampled in response to a reproduction horizontal scanning signal are judged by decision by majority to determine to which one of the first and second digital color signals Cb and Cr a digital color signal combined with a digital brightness signal Y in a signal for each horizontal period belongs. Meanwhile, the horizontal synchronizing signal HD from the input terminal 22 is supplied as a clock signal also to a D-type flip-flop circuit 28 serving as a ½ frequency divider, at which it is frequency divided to ½. An inverted output terminal of the flip-flop circuit 28 is connected directly to a data input terminal of the flip-flop circuit 28. Output signals of the majority decision logic circuit 27 and flip-flop circuit 28 are supplied to a multiplexer 29, which is changed over in response to a noise bar signal NB received from a further input terminal 23 to select one of the received output signals to output a write enable signal WE1, WE3 or another write enable signal WE2, WE4. The write enable signal WE1, WE3 is outputted from an output terminal 30 while the write enable signals WE2, WE4 is outputted from another output terminal 31, and the output write enable signals WE1, WE3 and WE2, WE4 are supplied to the frame memory 7 shown in FIG. 1. From the multiplexer 29, normally an output of the majority decision logic circuit 27 is outputted as the write enable signal WE1, WE3 while an inverted output of the same is outputted as the write enable signal WE2, WE4, but within a noise bar period, an output of the flip-flop circuit 28 is outputted as the write enable signal WE1, WE3 while an inverted output of the same is outputted as the write enable signal WE2, WE4.

Subsequently, operation of the reproducing system shown in FIG. 1 upon standard speed reproduction will be described. It is to be noted that, in this instance, write enable signals WE1 to WE4 from the type code signal ID detecting circuit 4 are ignored. When shuffled, time base elongated digital TCI signals for two fields, that is, reproduction video signals (consisting of reproduction signals 1SEG, 2SEG, 3SEG and 4SEG for a ½ field reproduced from first, second, third and fourth sets of inclined tracks on a magnetic tape), are reproduced from a magnetic tape by the rotary magnetic heads Ha and Hb, the reproduction signals 1SEG, 2SEG, 3SEG and 4SEG for the ½ field are written into the memories 8, 9, 10 and 11 of the circuits KA and KB corresponding to the four sets of the inclined tracks in response to the write enable signals WE1, WE2, WE3 and WE4 transmitted to the memories 8, 9, 10 and 11, respectively. In this instance, a type code signal ID is not utilized.

In the first field, signals are read out alternately from the memories 8 and 9 for each one horizontal period, but in the second field, signals are read out alternately from the memories 10 and 11 for each one horizontal period so that a deshuffled, time base error corrected TCI signal is outputted from the memory 7 or each of the circuits KA and KB. Such TCI signal is composed of a signal of the first field consisting of a mixture of the reproduction signals 1SEG and 2SEG for the ½ field and another signal of the second field consisting of a mixture of the reproduction signals 3SEG and 4SEG for the ½ field. It is to be noted that a read enable signal then is omitted in FIG. 4.

The deshuffled, time base error corrected digital TCI signals from the frame memories 7 of the circuits KA and KB are supplied to a TCI decoder 12, at which they are decoded. In particular, they are first time base elongated as a whole, and then, individual digital line sequential color signals are time base elongated to four times and then converted into digital simultaneous color signals, that is, first and second digital color signals. The digital brightness signal and first and second digital color signals are supplied respectively to digital to analog (D/A) converters 13, 14 and 15, at which they are individually converted into analog signals. Thus, an analog brightness signal Y and first and second analog color signals Pb and Pr are outputted by way of low-pass filters not shown to output terminals 16, 17 and 18, respectively.

Subsequently, operation of the reproducing system shown in FIG. 1 upon different speed reproduction will be described. Upon different speed reproduction, a type code signal for continuous 5 lines is supplied to the majority decision logic circuit 27 to determine to which one of the first and second digital color signals Pb and Pr a digital color signal C of a signal for each one horizontal period in a reproduced, time base elongated, shuffled digital TCI signal belongs, and write enable signals WE1, WE3 and WE2, WE4 are formed in accordance with such determination. The write enable signals WE1, WE3 and WE2, WE4 vary for each line in response to an output of "1" or "0" of the majority decision logic circuit 7. On the other hand, when the rotary magnetic heads Ha and Hb perform track jumping and consequently a noise bar is detected, then within such noise bar period, the enable signals WE1, WE3 and WE2, WE4 change to such signals having reproduction horizontal scanning signals which vary between "1" and "0" for each line obtained by frequency division by the flip-flop circuit 28. It is to be noted that the enable signal WE1 and the enabole signal WE2 are opposite in phase to each other, and similarly, the enable signals WE3 and WE4 are opposite in phase to each other.

Figure 4:
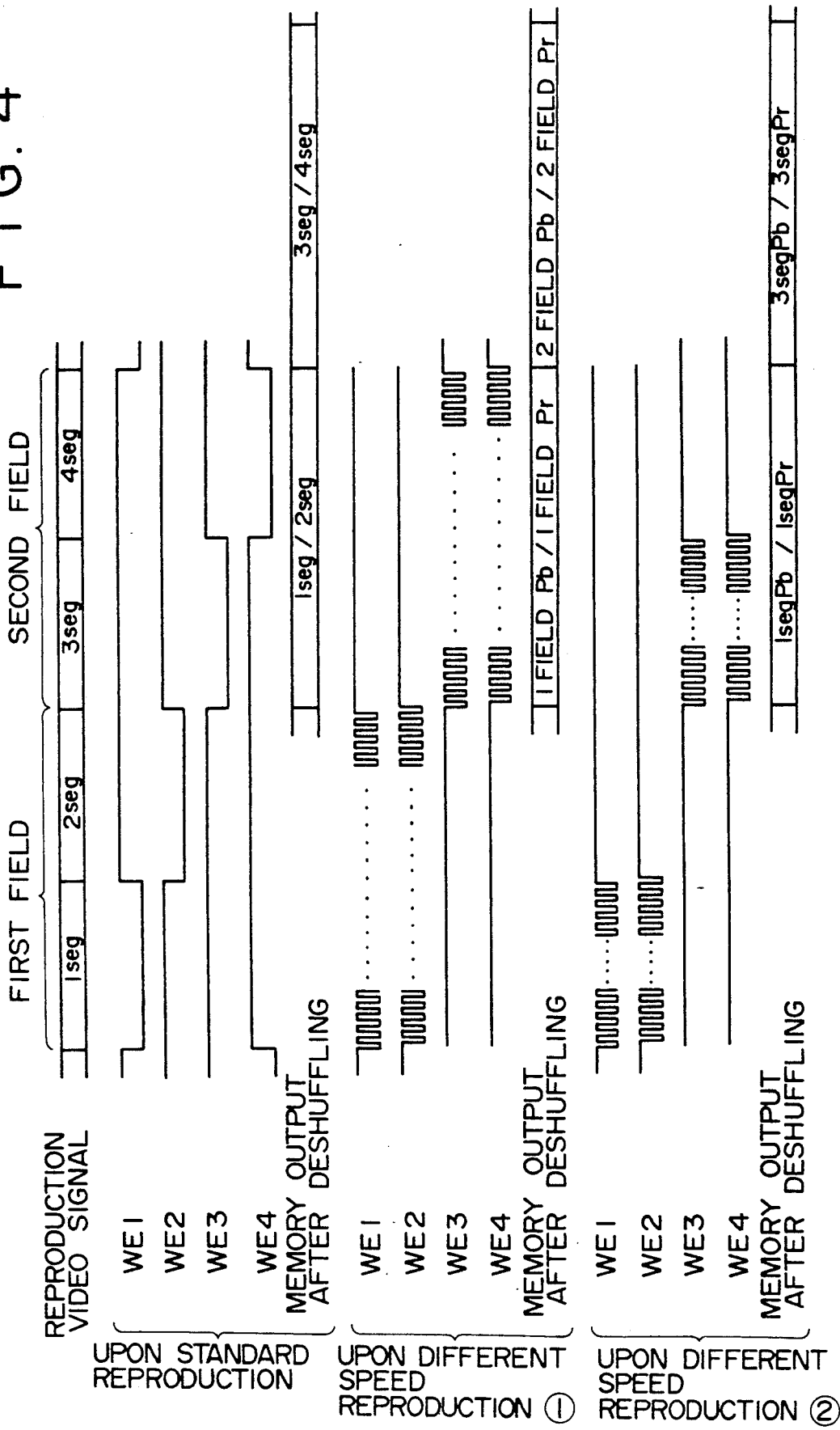
FIG. 4 is a time chart illustrating operation of the reproducing system of FIG. 1 upon standard speed reproduction and upon two and three times speed reproduction.

Subsequently, operation upon two times speed reproduction (different speed reproduction ①) will be described with reference to FIG. 4. When time base elongated digital TCI signals for two fields reproduced at a different speed, that is, at a speed two times that upon ordinary speed feeding, by the rotary magnetic heads Ha and Hb are supplied to the frame memories 7, in the first field, only signals for one horizontal period including a digital brightness signal Y and a first digital color signal Pb are written into the memories 8 in response to a write enable signal WE1, and only signals for one horizontal period including a digital brightness signal Y and a second digital color signal Pr are written into the memories 9 in response to a write enable signal WE2. On the other hand, in the second field, only signals for one horizontal period including a digital brightness signal Y and a first digital color signal Pb are written into the memories 10 in response to a write enable signal WE3, and only signals for one horizontal period including a digital brightness signal Y and a second digital color signal Pr are written into the memories 11 in response to a write enable signal WE4.

In the first field, signals are read out for each horizontal period alternately from the memories 8 and 9, but in the second field, signals are read out for each horizontal period alternately from the memories 10 and 11, and consequently, deshuffled, time base error corrected TCI signals are outputted. Each of the deshuffled, time base error corrected TCI signals is composed of a mixture signal of first and second digital color signals Pb and Pr of the first field and another mixture signal of first and second digital color signals Pb and Pr of the second field. It is to be noted that a read enable signal then is omitted in FIG. 4.

When deshuffled, time base compressed digital TCI signals for two fields are to be read out from each of the frame memories 7, in the first field, first and color signals Pb and Pr are read out for every other line alternately from the memories 8 and 9, and in the second field, first and second digital color signals Pb and Pr are read out for every other line alternately from the memories 10 and 11, and consequently, a deshuffled, time base error corrected, ½ time base compressed TCI signal is outputted. The TCI signal is composed of a mixture signal (first field signal) of the first and second digital color signals Pb and Pr of the first field and another mixture signal (second field signal) of the first and second digital color signals Pb and Pr of the second field. It is to be noted that a read enable signal then is omitted in FIG. 4.

Subsequently, operation upon three times speed reproduction (different speed reproduction ②) will be described with reference to FIG 4. When time base elongated digital TCI signals for two fields reproduced at a different speed, that is, at a speed three times that upon ordinary speed feeding, by the rotary magnetic heads Ha and Hb are supplied to the frame memories 7, in the former half of the first field, only signals for one horizontal period including a digital brightness signal Y and a first digital color signal Pb are written into the memories 8 in response to a write enable signal WE1, and only signals for one horizontal period including a digital brightness signal Y and a second digital color signal Pr are written into the memories 9 in response to a write enable signal WE2. It is to be noted that, in the latter half of the first field, no writing operation of the frame memories 7 is performed. On the other hand, in the former half of the second field, only signals for one horizontal period including a digital brightness signal Y and a first digital color signal Pb are written into the memories 10, and only signals for one horizontal period including a digital brightness signal Y and a second digital color signal Pr are written into the memories 11 in response to a write enable signal WE4. It is to be noted that, it the latter half of the second field, no writing operation of the frame memories 7 is performed.

In the first field, signals are read out for each horizontal period altenately from the memories 8 and 9 and besides twice repetitively in the former and latter halves of the first field, but in the second field, signals are read out for each horizontal period alternately from the memories 10 and 11 and besides twice repetitively in the former and latter halves of the second field, and consequently, deshuffled, time base error corrected TCI signals are outputted. Each of the deshuffled, time base error corrected TCI signals is composed of a repetition of a mixture signal of the first and second digital color signals Pb and Pr of the reproduction signal 1SEG for a ⅓ field and a repetition of another mixture signal of the first and second digital color signals Pb and Pr of the reproduction signal 3SEG. It is to be noted that a read enable signal then is omitted in FIG. 4.

Figure 5:
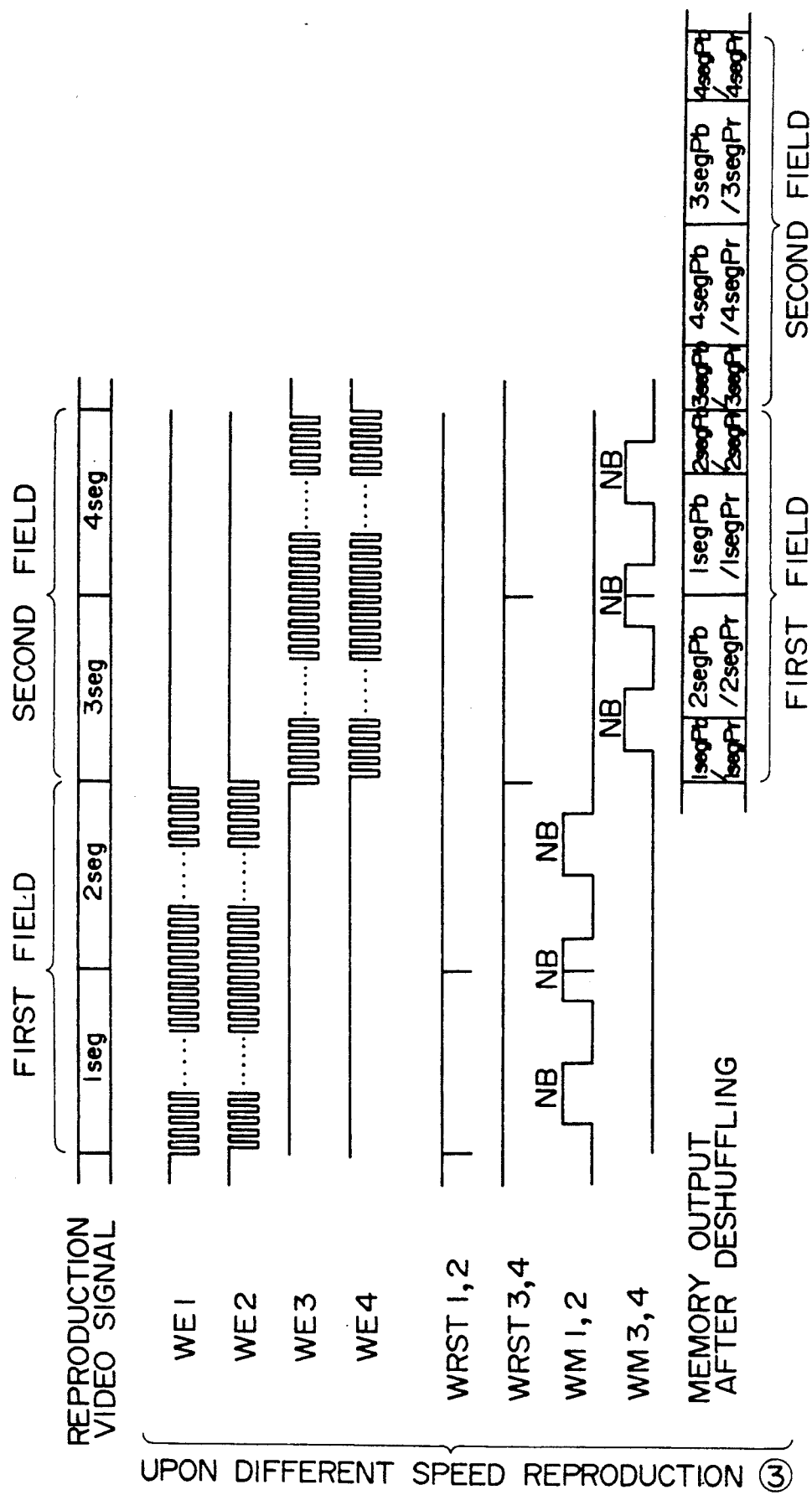
FIG. 5 is a similiar view but illustrating operation of the reproducing system of FIG. 1 upon 2.5 times speed reproduction.

Subsequently, operation upon 2.5 times speed reproduction (different speed reproduction ③) will be described with refernece to FIG. 5. When time base elongated digital TCI signals for two fields reproduced at a different speed, that is, at a speed 2.5 times that upon ordinary speed feeding, by the rotary magnetic heads Ha and Hb are supplied to the frame memories 7, in the first field. only signals for one horizontal period including a digital brightness signal Y and a first digital color signal Pb are written into the memories 8 in response to a write enable signal WE1, and only signals for one horizontal period including a digital brightness signal Y and a second digital color signal Pr are written into the memories 9 in response to a write enable signal WE2. On the other hand, in the second field, only signals for one horizontal period including a digital brightness signal Y and a first digital color signal Pb are written into the memories 10 in response to a write enable signal WE3, and only signals for one horizontal period including a digital brightness signal Y and a second digital color signal Pr are written into the memories 11 in response to a write enable signal WE4.

Meanwhile, in a period of a noise bar NB of the first field, a write masking signal WM1, WM2 for the memories 8 and 9 is produced so that, when the write enable signal WE1, WE2 is equal tp "0" (write enabled), only a write address counter for the memories 8 and 9 is advanced while writing of the memories 8 and 9 is inhibited, but when the write enable signal WE1, WE2 is equal to "1" (write disabled), the address counter for the memories 8 and 9 is stopped. Similarly, also in a period of a noise bar NB of the second field, a write masking signal WM3, WM4 for the memories 10 and 11 is produced similarly so that, when the write enable signal WE3, WE4 is equal to "0" (write enabled), only a write address counter for the memories 10 and 11 is advanced while writing of the memories 10 and 11 is inhibited, but when the write enable signal WE3, WE4 is equal to "1" (write disabled), the address counter for the memories 10 and 11 is stopped. Further, in the first field, the memories 10 and 11 are reset at starting points of the reproduction signals 1SEG and 2SEG so that writing of signals may thereafter be performed beginning with a start address. Similarly, in the second field, the memories 10 and 11 are reset at starting points of the reproduction signals 1SEG and 2SEG so that writing of signals may thereafter be performed beginning with a start address. Thus, if a noise bar period NB is included in a reproduction signal from any segment inclined track, then a signal in the noise bar period is interpolated with a reproduction signal from a preceding segment inclined track to a make a signal free from a noise.

In the first field, signals are read out for each horizontal period alternately from the memories 8 and 9, but in the second field, signals are read out for each horizontal period alternately from the memories 10 and 11, and consequently, deshuffled, time base error corrected TCI signals are outputted. Each of the deshuffled, time base error corrected TCI signals is composed of a mixture signal for a 1/6 field of the first and second digital color signals Pb and Pr of the reproduction signal 1SEG in the former half of the first field, another mixture for a ⅓ field of the first and second digital color signals Pb and Pr of the reproduction signal 2SEG in the latter half of the first field, a further mixture signal for a ⅓ field of the first and second digital color signals Pb and Pr of the reproduction signal 1SEG in the former half of the first field and still further mixture signal for a 1/6 field of the first and second digital color signals Pb and Pr of the second reproduction signal 2SEG in the rear half of the first field as well as a mixture signal for a 1/6 field of the first and second digital color signals Pb and Pr of the reproduction signal 3SEG in the former half of the second field, another mixture signal for a ⅓ field of the first and second digital color signals Pb and Pr of the reproduction signal 4SEG in the latter half of the second field, a further mixture signal for a ⅓ field of the first and second digital color signals Pb and Pr of the reproduction signal 3SEG in the former half of the second field and a still further mixture signal for a 1/6 field of the first and second digital color signals Pb and Pr of the reproduction signal 4SEG in the latter half of the second field. It is to be noted that a read enable signal then is omitted in FIG. 5.

Figure 6A:
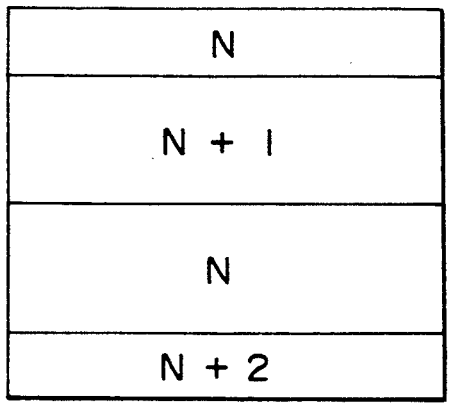
FIGS. 6A and 6B are diagrams showing screens of first and second fields upon 2.5 times speed reproduction.
Figure 6B:
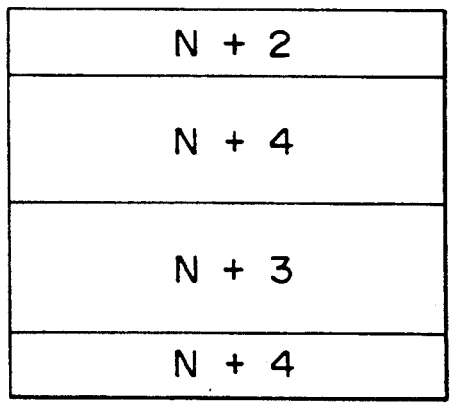
Figure 7:
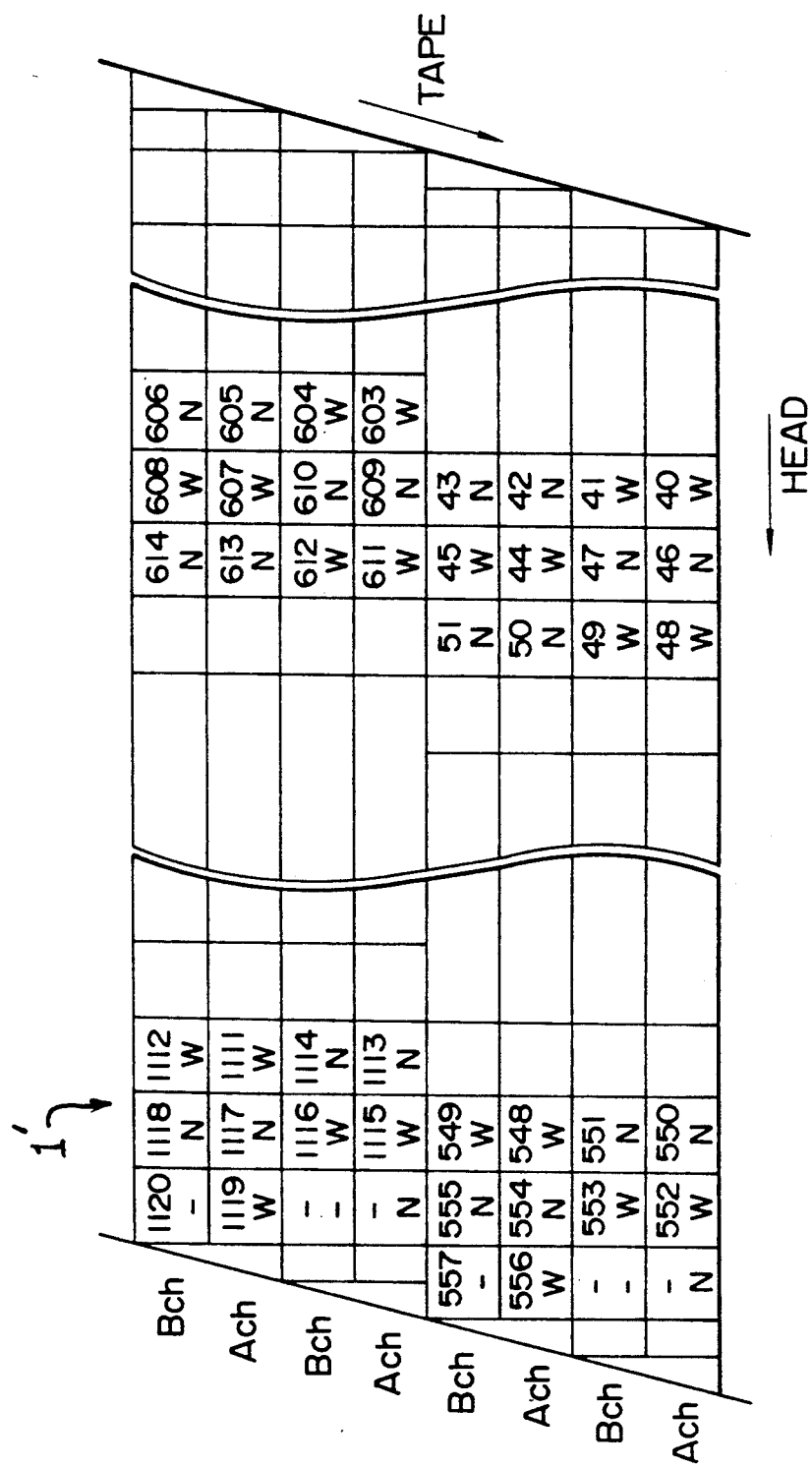
FIG. 7 is a diagram showing a recording pattern to which a color video signal recording method according to the present invention can be applied.

Referring to FIGS. 6A and 6B, field numbers of video signals constructing reproduction screens of the first and second fields upon 2.5 times speed reproduction are shown, respectively. In the first field, character N denotes a number of an interpolated filed, but in the second field, character N+2 and N+3 denote each a number of an interpolated field.

Having now fully described the invention, it will be apparent to one of ordinary skill in the art that many changes and modifications can be made thereto without departing from the spirit and scope of the invention as set forth herein.

What is claimed is:

1. A method of recording and reproducing a color video signal which includes a brightness signal and first and second chroma signals, the method comprising the steps of:

time base elongating said brightness signal to obtain a time base elongated brightness signal:

time base compressing said first and second chroma signals to obtain first and second time base compressed chroma signals;

alternately combining a first time base compressed chroma signal for one horizontal period and a second time base compressed chroma signal for one horizontal period with a time base elongated brightness signal for one horizontal period to form a time division multiplexed color video signal for one horizontal period;

adding to each time division multiplexed color video signal for one horizontal period a type code signal representative of the type of chroma signal used to form said time division multiplexed color video signal;

dividing the time division multiplexed color video signals into N channels, N being an integer equal to or higher than 2;

shuffling the time division multiplexed color video signal for the N channels for each predetermined video signal unit to obtain recording color video signals;

recording the recording color video signals for the respective channels simultaneously onto a record medium by means of N heads;

reproducing the recorded color video signals for the N channels from the record medium simultaneously by N heads to obtain reproduction color video signals for N channels;

separating the type code signals from the reproduction color video signals;

writing and then reading the reproduction color video signals into and from deshuffling memories in accordance with the separated type code signals to obtain deshuffled reproduction color video signals; and decoding the deshuffled reproduction color video signals to obtain said color video signal consisting of said brightness signal and first and second chroma signals.

* * * * *